(12) United States Patent
Uyeno et al.

(10) Patent No.: US 9,904,081 B2
(45) Date of Patent: Feb. 27, 2018

(54) LCWG STEERED LASER TRANSMITTER AND SITUATIONAL AWARENESS SENSOR WITH WAVELENGTH CONVERSION

(71) Applicant: Raytheon Company, Waltham, MA (US)

(72) Inventors: Gerald P. Uyeno, Tucson, AZ (US); Sean D. Keller, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 64 days.

(21) Appl. No.: 15/187,221

(22) Filed: Jun. 20, 2016

(65) Prior Publication Data
US 2017/0363887 A1    Dec. 21, 2017

(51) Int. Cl.
| | | |
|---|---|---|
| *H01J 3/14* | (2006.01) | |
| *G02F 1/13* | (2006.01) | |
| *H01S 3/00* | (2006.01) | |
| *H01S 3/23* | (2006.01) | |
| *G02F 1/35* | (2006.01) | |
| *G01S 17/02* | (2006.01) | |

(52) U.S. Cl.
CPC .......... *G02F 1/1326* (2013.01); *G01S 17/026* (2013.01); *G02F 1/3501* (2013.01); *H01S 3/0071* (2013.01); *H01S 3/0092* (2013.01); *H01S 3/2308* (2013.01); *G02F 2001/3509* (2013.01)

(58) Field of Classification Search
CPC .......... G01S 7/4817; G02F 1/295; G02F 1/29; G02F 2001/291
See application file for complete search history.

(56) References Cited

U.S. PATENT DOCUMENTS

| | | |
|---|---|---|
| 6,130,783 A | 10/2000 | Yagi et al. |
| 6,714,568 B2 | 3/2004 | Hunt |
| 7,135,672 B2 | 11/2006 | Land |

(Continued)

FOREIGN PATENT DOCUMENTS

WO    2009014662 A1    1/2009

OTHER PUBLICATIONS

Fukumoto et al., "All solid-state, 8-12 μm continuously tunable DIAL laser transmitter with patterncontrollable, rapid wavelength switching," © 2003 OSA/ASSP 2003.

(Continued)

*Primary Examiner* — Thanh Luu
(74) *Attorney, Agent, or Firm* — Eric A. Gifford

(57) ABSTRACT

A steerable laser transmitter and situational awareness sensor uses a liquid crystal waveguide (LCWG) to steer a spot-beam onto a conical mirror, which in turn redirects the spot-beam to scan a FOV. The spot-beam passes through one or more annular sections of non-linearly material (NLM) formed along the axis and around the conical mirror. Each NLM section converts the wavelength of the spot-beam to a different wavelength while preserving the steering of the spot-beam. The LCWG may shape or move the spot-beam along the axis of the conic mirror to sequentially, time or time and spatially multiplex the spot-beam between the original and different wavelengths. This provides multispectral capability from a single laser source. The transmitter also supports steering the spot-beam at a wavelength at which the LCWG cannot steer directly.

21 Claims, 10 Drawing Sheets

(56) References Cited

U.S. PATENT DOCUMENTS

| | | |
|---|---|---|
| 7,969,558 B2 | 6/2011 | Hall |
| 8,767,190 B2 | 7/2014 | Hall |
| 2005/0271325 A1* | 12/2005 | Anderson ............... G02F 1/295 |
| | | 385/40 |

OTHER PUBLICATIONS

Wang et al., "Doppler Winds Lidar Technology Development and Demonstration," Space 2005 Aug. 30- Sep. 1, 2005, Long Beach, California.

* cited by examiner

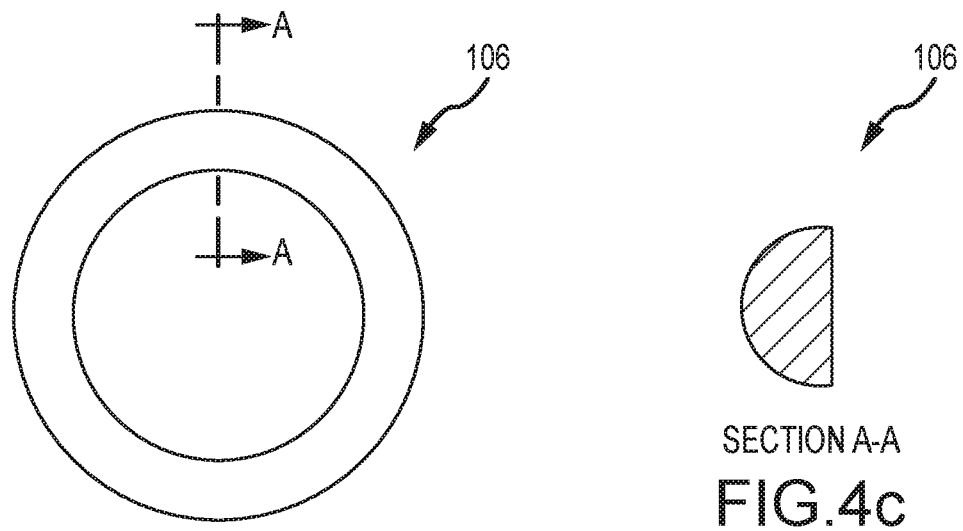
FIG.4b
SECTION A-A
FIG.4c
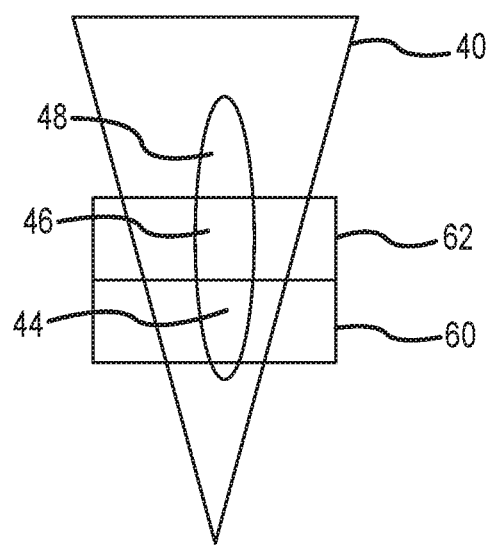
FIG.4d

SECTION A-A

SECTION B-B

LCWG STEERED LASER TRANSMITTER AND SITUATIONAL AWARENESS SENSOR WITH WAVELENGTH CONVERSION

RELATED APPLICATIONS

This application is related to U.S. Patent Application entitled "Electrically Operated Propellants", Ser. No. 14/748,928 filed on Jun. 24, 2015, the entire contents of which are incorporated by reference.

BACKGROUND OF THE INVENTION

Field of the Invention

This invention relates to steerable laser transmitters and situational awareness sensors, and more particularly to the use of a liquid crystal waveguide (LCWG) and conic mirror to steer a laser spot-beam over a sensor field-of-view (FOV) in combination with non-linear material to convert the wavelength of the laser spot-beam to one or more different wavelengths while preserving the steering of the spot-beam.

Description of the Related Art

Situational awareness is the perception of environmental elements with respect to time or space, the comprehension of their meaning, and the projection of their status after some variable has changed, such as time, or some other variable, such as a predetermined event. Situational awareness is critical in complex, dynamic systems such as aviation, air traffic control, ship navigation, collission avoidance, object targeting etc.

Situational awareness sensors may be passive or active. Passive sensors use a detector and ambient energy to detect and track objects in the sensor's FOV. Active sensors use a laser to illuminate objects in the FOV and a detector to detect reflected energy. The active sensor may be configured to produce an intensity image or a range map of the illuminated object. Active sensors have the advantages of illuminating a target with a laser and being able to provide range information. However, lasers can be large and expensive and raise the overall "SWaP-C" (size, weight, power and cost) of the sensor.

One type of active sensor uses flash illumination to simultaneously illuminate the entire FOV and a pixelated detector to detect reflected energy. This approach requires a laser with a lot of power, hence size, weight and cost, to provide the requisite energy density over the FOV to detect objects at typical distances. Flash illumination also produces atmospheric backscatter that reduces the signal-to-noise ratio (SNR) of the detected objects. Flash illumination does have the benefit of no moving parts.

Another type of active sensor uses a single laser to generate a collimated spot-beam. A mirror is physically rotated to scan the collimated spot-beam over a 360 degree horizontal FOV. The entire sensor may be actuated up and down to scan a desired vertical FOV. A single detector senses a reflected component of the spot-beam. This approach can use a less powerful laser and reduces atmospheric backscattering but is mechanically scanned. Mechanical scanning has a large SWaP-C due to the size of the mechanical structures and motors.

Velodyne Lidar offers a suite of LIDAR sensors that provide a 360 degree horizontal FOV and a 30-40 degree vertical FOV for real-time autonomous navigation, 3D mobile mappig and other LIDAR applications (U.S. Pat. Nos. 7,969,558 and 8,767,190). The LIDAR sensor includes a base, a housing, a plurality of photon transmitters and photon detectors contained within the housing, a rotary motor that rotates the housing about the base, and a communication component that allows transmission of signals generated by the the photon detectors to external components. The photon transmitters and detectors of each pair are held in a fixed relationship with each other. The rotary component includes a rotary power coupling configured to provide power from an external source to the the rotary motor, the photon transmitters, and the photon detectors. This approach uses may small emitter/detector pairs but requires mechanical rotation to scan the horizontal FOV.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a steerable laser transmitter and situational awareness sensor that achieves SWaP-C and SNR improvements by scanning a spot-beam with no moving parts. One or more sections of non-linear material (NLM) are used to convert the wavelength of the spot-beam to a different wavelength while preserving the steering of the spot-beam. The device may be positioned in any horizontal or vertical direction and may rapidly scan a 360° horizontal FOV in the plane perpendicular to the axis of the device with a specified vertical FOV perpendicular to the plane of the scan. The device may also scan any portion of the FOV, jump between multiple discrete objects per frame, vary the dwell time on an object or compensate for other external factors to tailor the scan to a particular application or changing real-time conditions.

In an embodiment, a laser (CW or pulsed) is configured to generate a collimated spot-beam at an input wavelength along an optical axis. A liquid crystal waveguide (LCWG) oriented along the optical axis is responsive to command signals to steer the spot-beam in two-dimensions about the optical axis. A fixed mirror having one or more conically shaped sections, each rotationally symmetric about the optical axis, with one or more apex angles at different positions along the optical axis re-directs the spot-beam to scan a two-dimensional FOV to generate a single or multispectral laser scan. One or more annular sections of non-linearly material (NLM) are positioned along the optical axis and around the conical mirror adjacent the corresponding conically shaped section of the fixed mirror. Each NLM section converts the input wavelength of the spot-beam to a different output wavelength while preserving the steering of the spot-beam. The LCWG may shape or move the spot-beam along the axis of the conic mirror to sequentially, time or time and spatially multiplex the spot-beam between the original and different wavelengths while preserving the steering of the spot-beam. The input wavelength may be preserved as one of the output wavelengths by omitting a section of NLM. A 1.06 micron laser may be converted to 1.55 micron or 0.532 micron or left as 1.06 micron. The 1.06 micron laser may be converted to 0.532 micron (visible), 0.34 micron (ultraviolet) or 8-12 micron (LWIR). This provides multispectral capability from a single laser source.

In an embodiment, a plurality of annular sections of NLM is positioned along the optical axis. Each section converts the input wavelength to a different output wavelength. Each conically shaped section is defined by a different apex angle at different positions along the optical axis that define different powered surfaces so that all of the beam are redirect perpendicular to the optical axis.

In an embodiment, an L0 optic is placed between the LCWG and the fixed mirror to shape the beam-spot so that it simultaneously covers a plurality (or all) of the conic sections to simultaneously generate a multispectral output. The L0 optic forms a ring around the optical axis and has a cross-section to the optical axis of a cylindrical lens.

In an embodiment, a ring amplifier comprising one or more pumps configured to pump a ring-shaped gain medium is placed around the optical axis between the conic section and the one or more NLM sections. The ring amplifier is configured such that the spot-beam at the input wavelength passes through the gain medium one or more times to amplify the spot-beam while preserving the steering of the spot-beam(s) over the FOV. The ring amplifier suitably comprises a plurality of mirrors positioned fore and aft of the gain medium to redirect the spot-beam traveling along a path perpendicular to the axis and offset along the optical axis from the ring amplifier planar faces to enter and exit approximately perpendicular to sidewalls of the gain medium and pass through the gain medium multiple times to amplify the spot-beam and return the amplified spot-beam along the path where it is redirected through the one or more NLM sections for wavelength conversion. In an embodiment in which a single NLM section is used to convert the input wavelength to a different output wavelength, the ring amplifier may be positioned inside the NLM section to amplify the spot prior to wavelength conversion or outside the NLM section to convert the wavelength prior to amplification.

In different embodiments, the sensor may include different combinations of optical components L1, L2 and L3. Optic L1 is configured to focus the collimated spot-beam onto the conical shape(s) of the fixed mirror. Optic L1 is sized to cover the area of the conic mirror for single or multispectral conversion. Optic L2 is configured to collimate the redirected spot-beam. Optic L3 is configured to direct the collimated redirected spot-beam through a discrete aperture. In an embodiment, N optical channels are spaced every 360/N degrees around the circumference of the conical shape. Each channel includes an Optic L2 and Optic L3 that guide the redirected spot-beam through a discrete aperture in a support member to scan 360/N degrees of the FOV.

The fixed mirror has a generally "conical shape", which is defined as "of, relating to, or shaped like a cone." A cone is defined as an axis perpendicular to a circular base, an apex located on the axis, and a surface that is the locus of straight lines from the apex to the perimeter of the circular base (C1). The fixed mirror may include one or more different conic sections depending on whether the output is single wavelength or multispectral. To preserve the beam steering in a multispectral application, the conic sections may be normal conic sections in which the axis intersects the center of the circular base or may be non-isometric conic sections in which the axis is offset from the center of the circular base producing line sections connecting the circular base to the apex of different lengths. Each conic section is rotationally symmetric about the optical axis.

In an embodiment, the controller issues command signals to steer the spot-beam in a circle around the conical shape and to vary the radius of the circle to move around the conical shape along the optical axis to scan a 360-degree region in Phi and a defined FOV in the X-Y plane (i.e., Theta Z'). If the conical shape is configured to reflect the spot-beam perpendicular to the optical axis, the beam scans a 360-degree horizontal FOV and a defined vertical FOV.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 4a-4d illustrate a side view, axial and section views of the L0 optic, and a top view of the spot-beam overlaid on the NLM sections and conic mirror for a simultaneous scan of the multispectral wavelengths;

DETAILED DESCRIPTION OF THE INVENTION

The present invention provides a steerable laser transmitter and situational awareness sensor that achieves SWaP-C and SNR improvements by scanning a multispectral spot-beam with no moving parts. A liquid crystal waveguide (LCWG) steers a spot-beam onto a conical mirror, which in turn redirects the spot-beam to scan a FOV. The spot-beam passes through one or more annular sections of non-linearly material (NLM) formed along the axis and around the conical mirror. Each NLM section converts the wavelength of the spot-beam to a different wavelength while preserving the steering of the spot-beam. The LCWG may shape or move the spot-beam along the axis of the conic mirror to sequentially, time or time and sequentially multiplex the spot-beam between the original and different wavelengths. For example, a 1.06 micron laser may be converted to output 1.55 micron and 0.532 micron or passed to output 1.06 micron. A 1.06 micron laser may be converted to 0.532 micron (visible), 0.34 micron (ultraviolet) or 8-12 micron (LWIR). This provides multispectral capability from a single laser source with no moving parts.

An important application of this configuration of steerable laser transmitter or situational awareness sensor is when the LCWG cannot be configured to steer the desired output wavelength. For example, with current technology, the LCWG cannot steer visible green light (0.532 micron). The LCWG may be not configurable at all or to the required specifications for steering speed, accuracy, cost, optical properties etc. It may be more efficient to steer the light at a different input wavelength and then convert the light to the desired output wavelength.

The device (laser transmitter or sensor) may rapidly scan a 360° horizontal FOV with a specified vertical FOV or any portion thereof, jump discretely between multiple specific objects per frame, vary the dwell time on an object or compensate for other external factors to tailor the scan to a particular application or changing real-time conditions. The axis of the device may be positioned in any horizontal or vertical direction and the sensor may rapidly scan a 360° field of view in the plane perpendicular to the axis of the device with a specified vertical field of view perpendicular to the plane of the scan. The plane perpendicular to the axis of the device is referred to as the "horizontal plane" in the remainder of this document, however, this plane does not have to be oriented horizontal (perpendicular to the direction of gravity), for the device to function. The device can be used to provide object intensity or ranging in complex, dynamic systems such as aviation, air traffic control, ship navigation, robotics, unmanned vehicles such as unmanned ground vehicles (UGVs) (e.g., a drone) or driverless cars, collission avoidance, object targeting, underwater (green laser) applications, etc.

Figure 1:
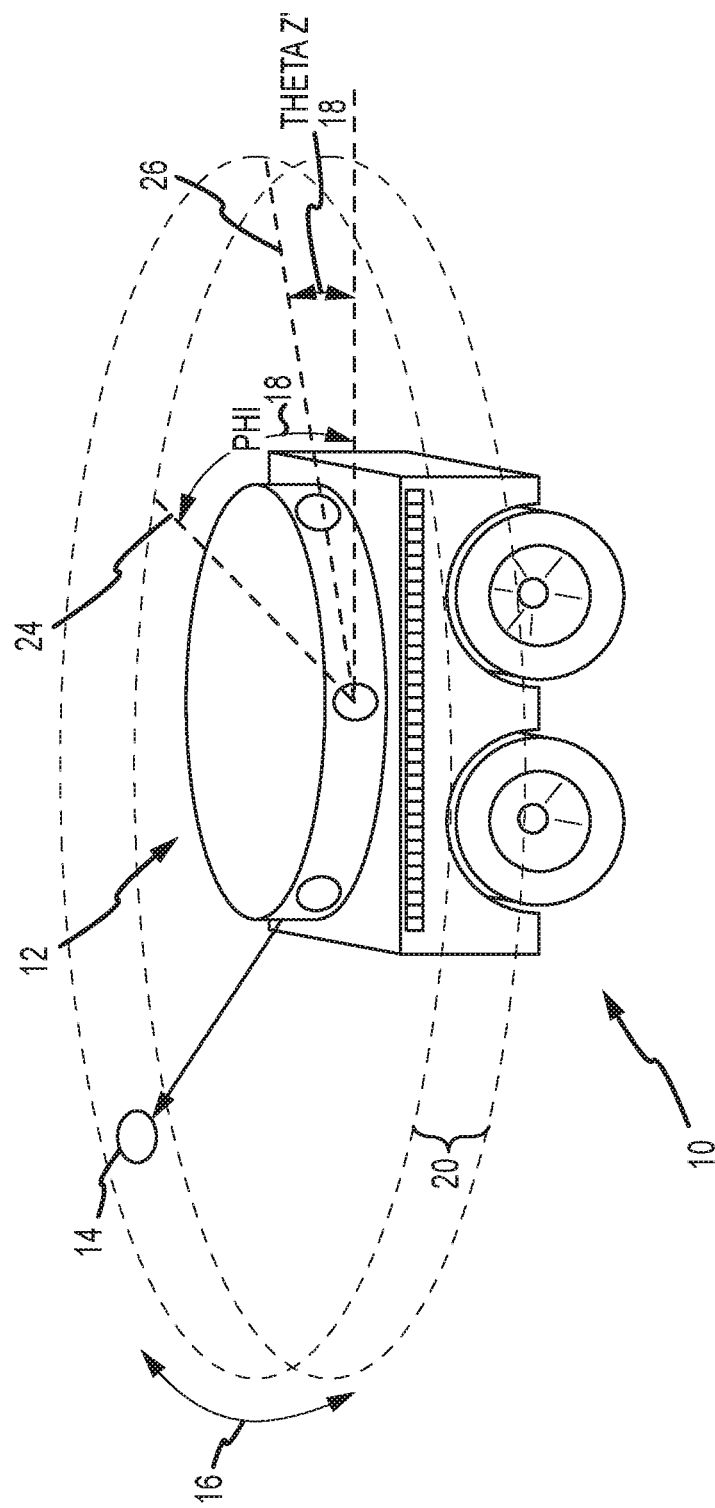
FIG. 1 is a diagram of a steerable laser transmitter and situational awareness sensor of the present invention.

Referring now to FIG. 1, in an embodiment an unmanned ground vehicle (UGV) 10 is outfitted with a steerable laser transmitter or active situational awareness sensor (the "device") 12. The sensor includes a detector, the transmitter does not. Device 12 is capable of scanning a collimated spot-beam 14, single wavelength or multispectral, over a 360° FOV 16 in angle Phi 18 and a defined FOV 20 in angle Theta Z' 22, typically 1 to 6 degrees in each spectral band In a specific configuration, the FOVs in angle Phi 16 and Theta Z' 18 correspond to horizontal and vertical FOV, respectively. In other embodiments, device 12 may be configured to scan a reduced FOV. For example, in some applications the sensor may need to only scan a forward 180° FOV.

Device 12 comprises a laser, a LCWG, a fixed mirror, a LCWG controller, a computer, various optical components and possibly a detector housed in a structural housing 24. One or more apertures 26 are formed in housing 24 to facilitate scanning spot-beam 14 over the FOV. To scan the 360° FOV 16, the housing may have a single continuous ring aperture or multiple discrete apertures placed every 360/N degrees.

The laser (CW or pulsed) is configured to generate a collimated spot-beam 14 at an input wavelength along an optical axis that is oriented in the Z direction. The LCWG is oriented along the optical axis and is responsive to command signals from the LCWG controller to steer the spot-beam 14 about the optical axis in two dimensions. The fixed mirror has a conical shape oriented along the optical axis and redirects the spot-beam 14 to a location Phi and Theta Z' in the FOV. One or more sections of non-linear material (NLM) are used to convert the input wavelength of the spot-beam to a different wavelength(s) while preserving the steering of the spot-beam. The various optical components are configured, at least in part, based on the particular aperture configuration of the sensor to scan the spot-beam 14 over the FOV. A detector can be configured to sense a reflected component of the spot-beam, which can be processed to provide intensity or range.

The combination of the LCWG and fixed conic mirror to steer and redirect a laser spot-beam provides many advantages over known active situational awareness sensors. The SWaP-C benefits of using a single laser to produce a spot-beam without mechanical or rotary scanning are considerable. The use of a scanned spot-beam significantly reduces atmospheric backscatter, thus improving SNR. Additionally, replacing mechanical scanning with solid-state steering via the LCWG provides considerable flexibility for operating the sensor. Whereas the mechanically or rotary scanned sensors are limited to continuously scanning the same 360° horizontal FOV over and over, the LCWG steered sensor may rapidly scan a 360° horizontal FOV with a specified vertical FOV or any portion thereof, jump discretely between multiple specific objects per frame, vary the dwell time on an object or compensate for other external factors to tailor the scan to a particular application or changing real-time conditions. Incorporation of the one or more sections of NLM enables LCWG steering at a wavelength not supported by LCWG technology and enables a multispectral output without mechanical steering over a 360° horizontal FOV.

U.S. Pat. No. 8,380,025 entitled "Liquid Crystal Waveguide Having Refractive Shapes for Dynamically Controlling Light" assigned to Vescent Photonics, Inc. is hereby incorporated by reference. The patent discloses a LCWG that is configurable to form and scan a laser spot over a FOV in a frame time to provide a relative illumination for optical NUC of active mode image sensors. A time varying voltage is applied to the LCWG to modulate the liquid crystal material in order to form and position the laser spot according to the specified scan pattern. Liquid crystal waveguides dynamically control the refraction of light. Generally, liquid crystal materials may be disposed within a waveguide in a cladding proximate or adjacent to a core layer of the waveguide. In one example, portions of the liquid crystal material can be modulated to form refractive optical component shapes (e.g. lenses or prisms) in the cladding that interact with a portion (specifically the evanescent field) of light in the waveguide so as to permit electronic control of the refraction/bending, focusing, or defocusing of light as it travels through the waveguide.

In one example, a waveguide may be formed using one or more patterned or shaped electrodes that induce formation of such refractive shapes of liquid crystal material, or alternatively, an alignment layer may have one or more regions that define such refractive or lens shapes to induce formation of refractive or lens shapes of the liquid crystal material. The electrodes are positioned within the LCWG and orientated according to the shape of the LCWG core such that each electrode modulates the liquid crystal material for a different direction of steering (i.e. one electrode steers positive theta X, another steers negative theta X and a third steers in theta Y). In another example, such refractive shapes of liquid crystal material may be formed by patterning or shaping a cladding to define a region or cavity to contain liquid crystal material in which the liquid crystal materials may interact with the evanescent light. The LCWG controller includes command and synchronization electronics that receive a start of frame/row from a ROIC and generate analog drive signals that specify the scan pattern and a drive controller that converts the analog drive signals to a high frequency, high voltage drive signal applied to the LCWG. These command and synchronization electronics may also synchronize the pulses from the laser source.

The LCWG is single-mode. It can generate and scan a very narrow band around a single frequency. For example, 1.06 micron or 1.55 micron plus/minus 10 nm. Current LCWG technology cannot generate and steer certain wavelengths and does not possess the bandwidth to generate a multispectral output.

Figure 2:
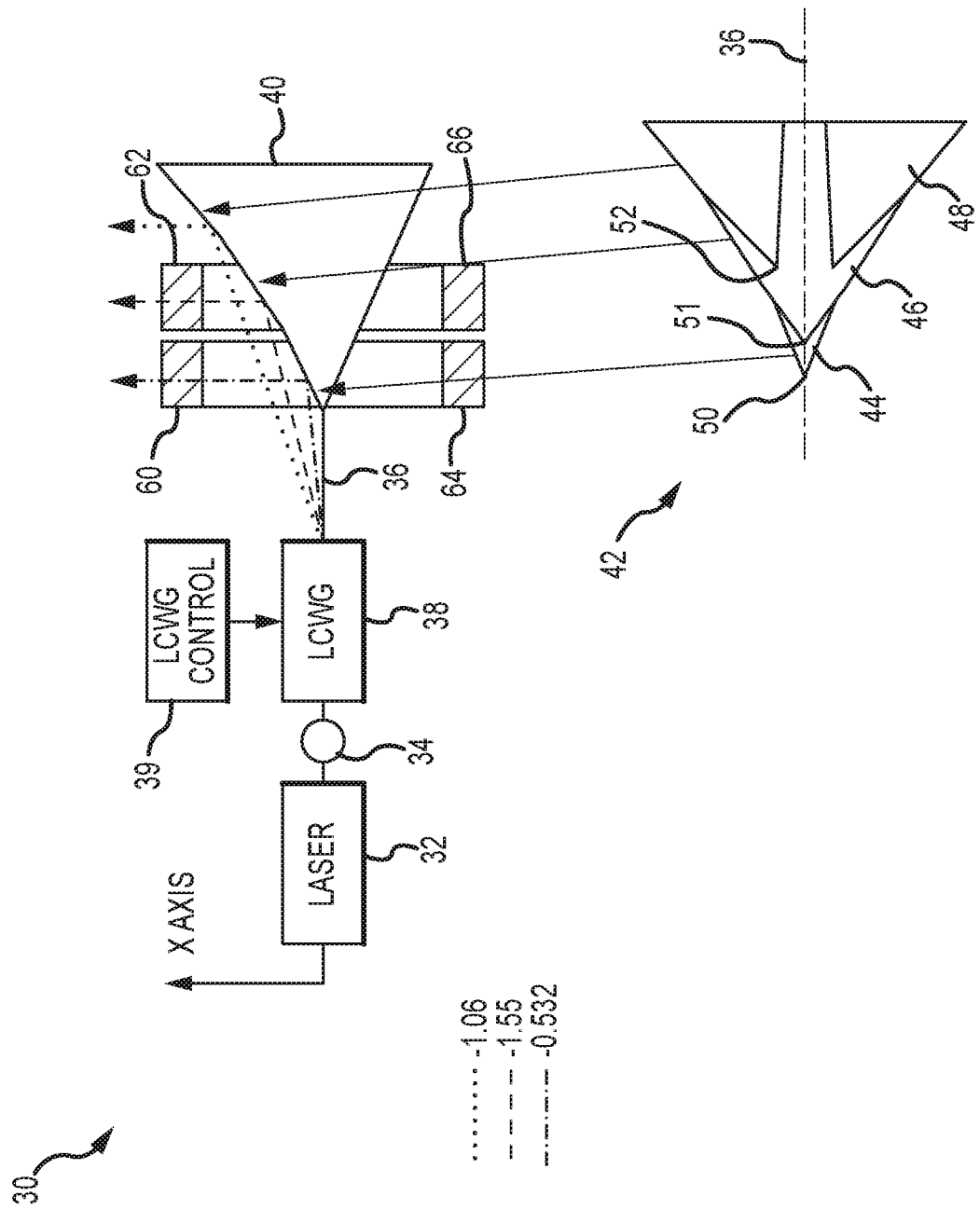
FIG. 2 is side view of an embodiment of a multispectral LCWG steered laser transmitter and detailed side view of the conic sections of the fixed mirror.

Referring now to FIG. 2, an embodiment of a laser transmitter 30 comprises a laser 32 configured to generate a collimated spot-beam 34 at an input wavelength along an optical axis 36. A LCWG 38 is oriented along the optical axis 36 and is responsive to command signals from a LCWG controller 39 to steer the collimated spot-beam 34 at the input wavelength in two-dimensions about the optical axis 36. As used herein, a collimated spot-beam is at least collimated to a first order as would be understood by those skilled in the relevant art.

A fixed mirror 40 has a generally conical shape 42 oriented along the optical axis 36 (coincident with or offset from in different configurations) to redirect the spot-beam 34 to a location in the two-dimensional FOV. Steering spot-beam 34 in a circle around the conical shape scans the redirected spot-beam 34 around a 360° FOV (e.g., horizontal). Varying the radius of the circle scans the redirected spot-beam 34 in a defined FOV (e.g., vertical). The angle of the conical shape 42 of fixed mirror 40 may or may not be configured such that the spot-beam 34 is redirected perpendicular to optical axis 36. For simplicity of illustration, the angle of conical shape 42 does redirect spot-beam 34 perpendicular to optical axis 36 in this embodiment.

The fixed mirror 40 has a generally "conical shape" 42, which is defined as "of, relating to, or shaped like a cone." A cone is a three dimensional geometric shape described by a circular base, an axis perpendicular to a circular base, an apex located on the axis, and a surface that is the locus of straight lines from the apex to the perimeter of the circular base (C1). A "normal" cone (CN1) is a cone in which the axis intersects the base in the center of the circle and the surface is rotationally symmetric about the axis.

If the laser transmitter 30 is configured to convert the input wavelength of the spot-beam 34 to a single output wavelength (different than the input wavelength), fixed mirror 40 comprises a single conic section. For example, a 1.06 micron input wavelength could be converted to one of 0.532 (visible-green), 0.355 micron (UV). 1.55 micron (SWIR) or a LWIR between 8-12 microns. If the laser transmitter 30 is configured to convert the input wavelength of the spot-beam 34 to a multispectral output, fixed mirror 40 comprises multiple conic sections of different conical shapes to preserve the steering of each of the spot-beams at the different wavelengths. For example, a 1.06 micron laser may be converted to output the 1.55 micron and 0.532 micron beams and passed to output the 1.06 micron beam. The different spectral beams may be scanned sequentially, time and/or spatially multiplexed or simultaneously.

In this embodiment, laser transmitter 30 is configured to generate 0.532, 1.55 and 1.06 micron spot-beams, either sequentially or multiplexed, from a 1.06 micron source laser 32. Fixed mirror 40 includes three conic sections 44, 46 and 48 having different conic shapes and positioned one after the other along optical axis 36 to define the 2D mirror profile. Each conic shape 44, 46 and 48, as defined by the radius (r) of its circular base and the position of the apex 50, 51 and 52, respectively, along the axis perpendicular to the circular base, is configured to re-direct the spot-beam 34 perpendicular to optical axis 36. Each conic section is rotationally symmetric about optical axis 36. The conic sections may be isometric (normal cones) or non-isometric in which the apex is offset from the axis such that the line segments connecting the apex to the circle are of different lengths. The size of each conic section is a function of the size of the spot-beam and the stability of pointing.

A piecewise linear (PWL) approximation (P1) of a cone (C1 or CN1) is three dimensional geometric shape described by a base that is a polygon with 3 or more sides, an axis perpendicular to the base, an apex located on the axis and a surface that is the locus of straight lines from the apex to perimeter of the base. If the axis is located at the center of the polygon, the geometric shape is rotationally symmetric about the axis.

A cone (C1 or CN1) plus a powered optic (C2) is a three dimensional geometric shape described by a circular base, an axis perpendicular to the base, an apex located on the axis and a surface that is the locus of lines that curve in planes that are parallel to the axis from the apex to perimeter of the base. Because the mirror's surface is curved, the spot size is actually different at different locations on the mirror. This causes some distortions in the far field and extra beam divergence. Using an aspherical surface helps correct this. The effect is reduced with more apertures.

A PWL approximation of a cone (C1 or CN1) plus a powered optic (P2) is a three dimensional geometric shape described by a base that is a polygon with 3 or more sides, an axis perpendicular to the base, an apex located on the axis and a surface that is the locus of lines that curve in planes that are parallel to the axis from the apex to perimeter of the base.

A truncated cone (C3) is a three dimensional geometric shape described by a circular base, an axis perpendicular to the base, a top described by a circle and a surface that is the locus of straight lines parallel to the axis from the perimeter of the top to perimeter of the base.

A truncated PWL approximation of a cone (P3) is a three dimensional geometric shape described by a base that is a polygon with 3 or more sides, an axis perpendicular to the base, a top described by a polygon of 3 or more sides and a surface that is the locus of straight lines from the perimeter of the top to perimeter of the base.

A truncated cone plus a powered optic (C4) A three dimensional geometric shape described by a circular base, an axis perpendicular to the base that intersects the base in the center of the circle, a top described by a circle and a surface that is the locus of lines that curve in planes that are parallel to the axis from the perimeter of the top to perimeter of the base.

A truncated PWL approximation of a cone plus a powered optic (P4) A three dimensional geometric shape described by a base that is a polygon with 3 or more sides, an axis perpendicular to the base, a top described by a polygon of 3 or more sides and a surface that is the locus of lines that curve in planes that are parallel to the axis from the perimeter of the top to perimeter of the base.

Any of the above conical shapes can be combined to create an acceptable conical shape for each of the conic sections of the fixed mirror (i.e. a polygon base with a curved surface formed by the locus of curved lines from the apex to the perimeter of the polygon base). Any of the above conical shapes may be combined with focusing optic L1.

Any of the above conical shapes are subject to manufacturing tolerances of the fixed mirror. A conical shape, such as a normal cone, that is designed to be rotationally symmetric about the axis may deviate from such symmetry within the manufacturing tolerances. Alternately, a conical shape may be designed with the axis intentionally offset from the center of the base (circle or polygon) in order to scan a particular FOV. Another alternative is to use the LCWG to vary Theta Z as a function of Phi in order to scan a particular FOV with any conical shape.

To convert the input wavelength of 1.06 micron to a multispectral output of 1.06, 1.55 and 0.532 micron, a first and second annular cylindrically shaped optical elements 60 and 62 with optical non-linear material 64, 66, respectively, selected to convert 1.06 micron to 0.532 micron and 1.06 micron to 1.55 micron, respectively, are oriented along and coincident with optical axis 36 around conic sections 44 and 46, respectively, of fixed mirror 40. No NLM is positioned adjacent conic section 48, which is simply redirecting the 1.06 micron wavelength of spot-beam 34. The LCWG steers the spot-beam at the input wavelength to the appropriate conic section and around the conic section to scan a two-dimensional FOV at the desired output wavelength. Each optical element includes mirrors formed on both the inner and outer diameter of the ring. Both mirrors are partially transmissive to allow light to enter the NLM, perform the wavelength conversion and exit the NLM.

Nonlinear optics (NLO) is a branch of optics that describes behavior of light in nonlinear media, that is, media in which the dielectric polarization P responds nonlinearly to the electric field E of the light. Nonlinear optics explains nonlinear response of properties such as frequency (wavelength). Nonlinear materials are used in frequency mixing processes such as Second harmonic generation (SHG), or frequency doubling, generation of light with a doubled frequency (half the wavelength), two photons are destroyed creating a single photon at two times the frequency. Third harmonic generation (THG), generation of light with a tripled frequency (one-third the wavelength), three photons are destroyed creating a single photon at three times the frequency. Optical parametric oscillation (OPO), generation of a signal and idler wave using a parametric amplifier in a resonator (with no signal input). OPO uses an active gain media that requires pumping. The same principles as reflected in SHG, THG or OPO are used to select the nonlinear materials to convert from a known input wavelength to a specified output wavelength.

Figure 3C:
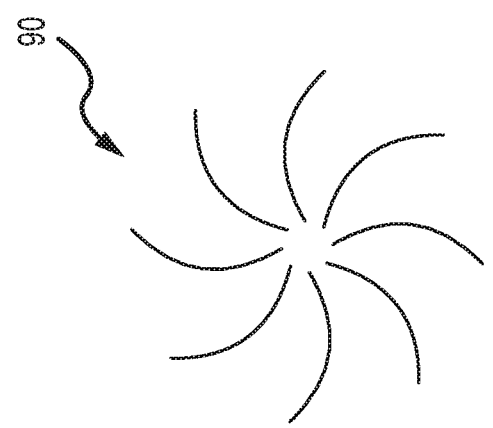
FIGS. 3a, 3b, 3c illustrate sequential wavelength, time multiplexed and time/spatial multiplexed multispectral steered spot-beams.
Figure 3B:
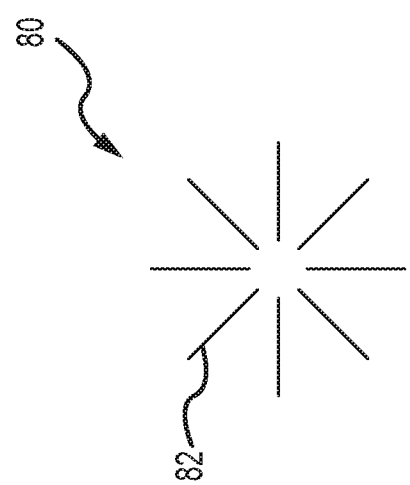
Figure 3A:
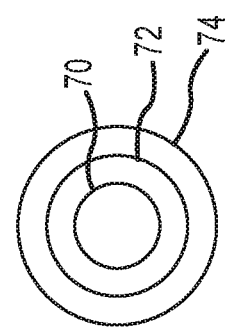

Referring now to FIGS. 3a-3b, a multispectral scan of the two-dimensional FOV can be generated by steering the spot-beam onto the different conic sections of the fixed mirror in multiple ways. The spot-beam is sized and steered to address only one conic section, one output wavelength, at a time. These techniques can be used separately or combined and may be adapted dynamically based on various system level inputs.

A "sequential wavelength" technique scans the FOV with a $1^{st}$ wavelength then a $2^{nd}$ wavelength and then a $3^{rd}$ wavelength. As shown in FIG. 3a, the spot-beam is scanned in a first circle 70 at a radius selected to intersect the first conic section to scan the $1^{st}$ wavelength, a second circle 72 at a larger radius selected to intersect the second conic section to scan the $2^{nd}$ wavelength, and a third circle 74 at a largest radius selected to intersect the third conic section to scan the $2^{nd}$ wavelength. This may be repeated to continuously scan the entire 2D FOV for each wavelength sequentially or in an arbitrary order.

A "time multiplexed wavelength" technique scans each of the $1^{st}$, $2^{nd}$ and $3^{rd}$ wavelengths at the given position in the FOV and repeats to scan the entire FOV. As shown in FIG. 3b, the spot-beam scans a first line 80 along each of the three conic sections of the fixed mirror at a location on the mirror corresponding to a desired position in the 2D FOV. The spot-beam is steered around the conic shape to a different location and scans a second line 82 along each of the three conic sections corresponding to a different position in the 2D FOV. This is repeated at multiple locations completing a circle around the conic shape of the fixed mirror to scan the entire 2D FOV. This might trace a scan in a 2D FOV of 0.532 0°, 1.55 0°, 1.06 0°, 0.532 2°, 1.55 2°, 1.06 2° and so forth.

A "time and spatially multiplexed wavelength" technique scans each of the $1^{st}$, $2^{nd}$ and $3^{rd}$ wavelengths at different positions in the FOV. As shown in FIG. 3c, the spot-beam is scanned in a spiral pattern 90. This is similar to the scan lines of the time-multiplexed technique except that instead of holding the location on the mirror constant the location around the conic section (position in the FOV) is indexed as well. This might trace a scan in a 2D FOV of 0.532 0°, 1.55 2°, 1.06 4°, 0.532 6°, 1.55 8°, 1.06 10° and so forth. Assuming equal scan rates, this approach can cover the same FOV in one-third the time as the time multiplexed technique.

Figure 4A:
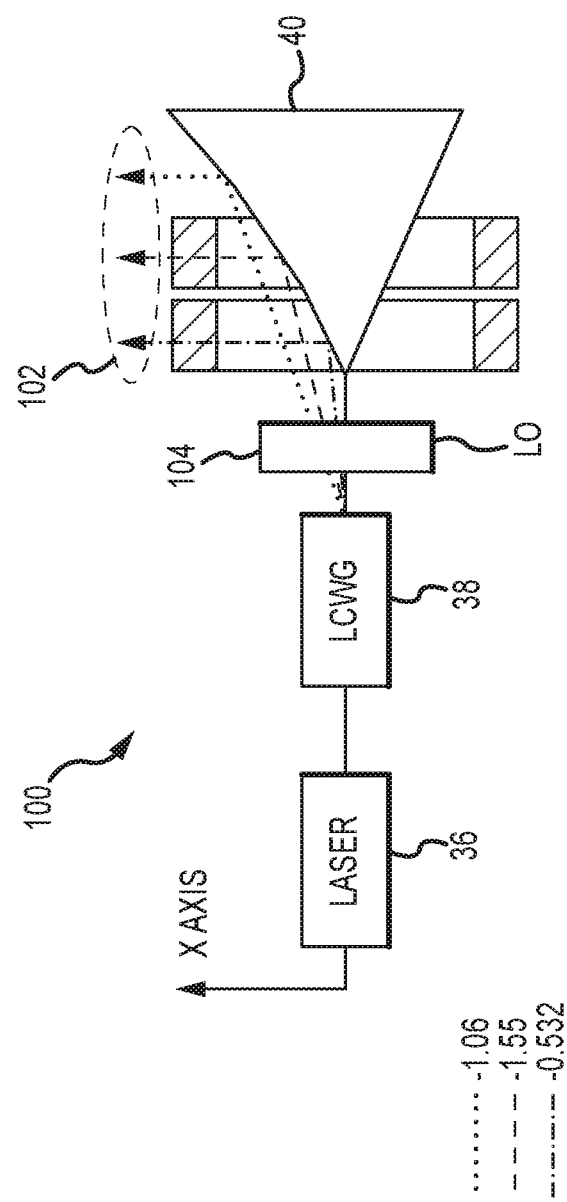

Referring now to FIGS. 4a-4e, an embodiment of a laser transmitter 100 is configured to simultaneously scan a multispectral spot-beam 102 over a 2D FOV. For purposes of brevity, reference will be made to the core elements of the laser transmitter as shown in FIG. 2, which are configured in a like manner. To produce multispectral spot-beam 102, an L0 optic 104 is inserted between LCWG 38 and fixed mirror 40 to shape the spot-beam to have an oblong shape whose major axis is oriented along optical axis 36 and whose minor axis is perpendicular to optical axis 36 so that the spot-beam covers a plurality (e.g., all) of the difference conic sections 44, 46 and 48 simultaneously. Spot-beam 102 is simultaneously redirected through the NLM of optical elements 60 and 62 and free space adjacent conic section 48 to produce a 0.55 micron, 1.55 micron and 1.06 micron multispectral spot-beam 102. As shown in FIGS. 4b and 4c, L0 optic 104 is a circular/cylindrical optic 106 that shapes the incoming spot into a line (the oblong spot) along the optical axis. L0 is a cylindrical lens that is rotationally symmetric about the optical axis. A simple circular scan by the LCWG of the oblong beam around fixed mirror 40 produces a single multispectral beam-spot that scans the entire 2D FOV.

Figure 5:
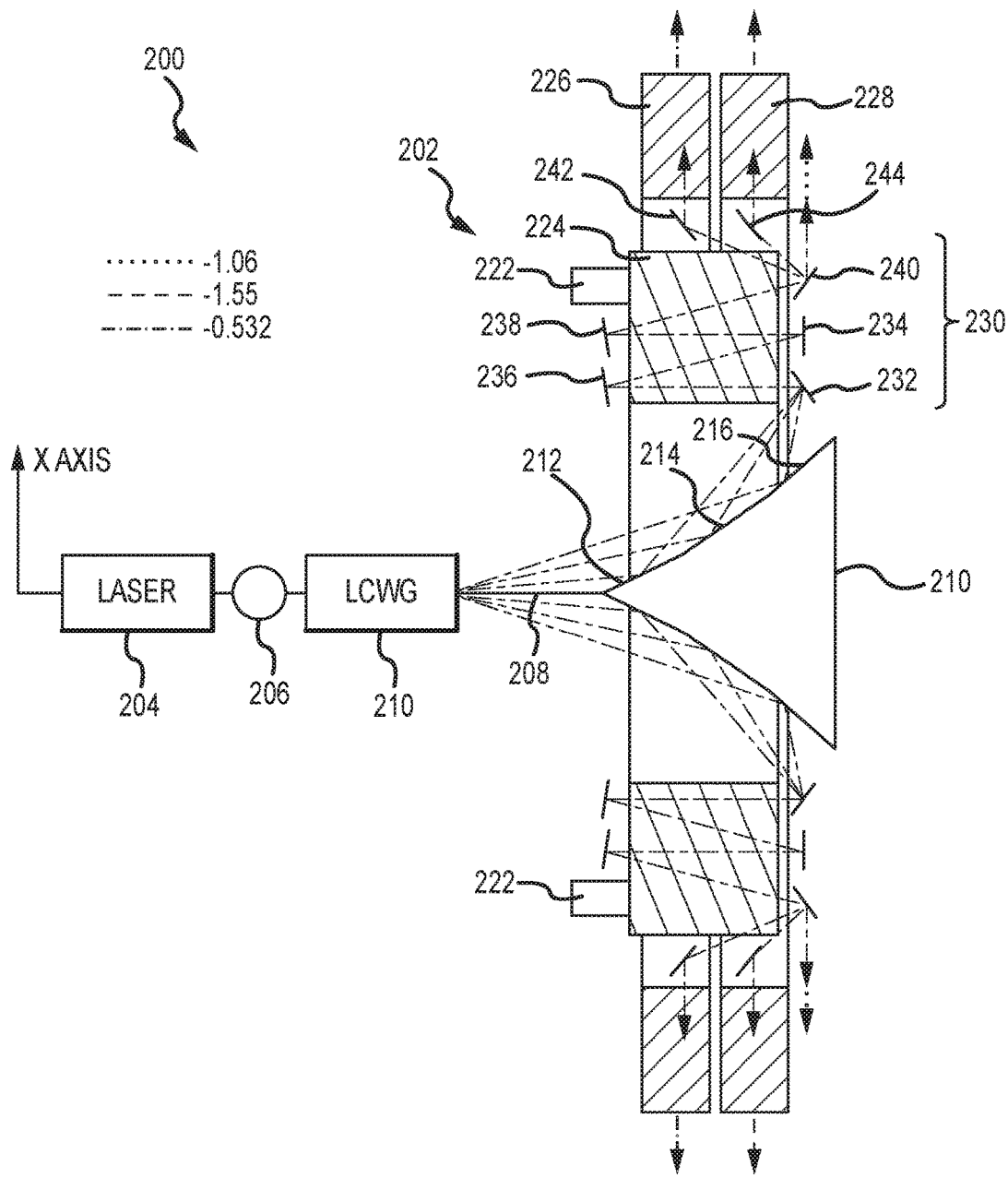
FIG. 5 is a side view of an embodiment of a multispectral LCWG steered laser transmitter with an optical ring amplifier.
Figure 6:
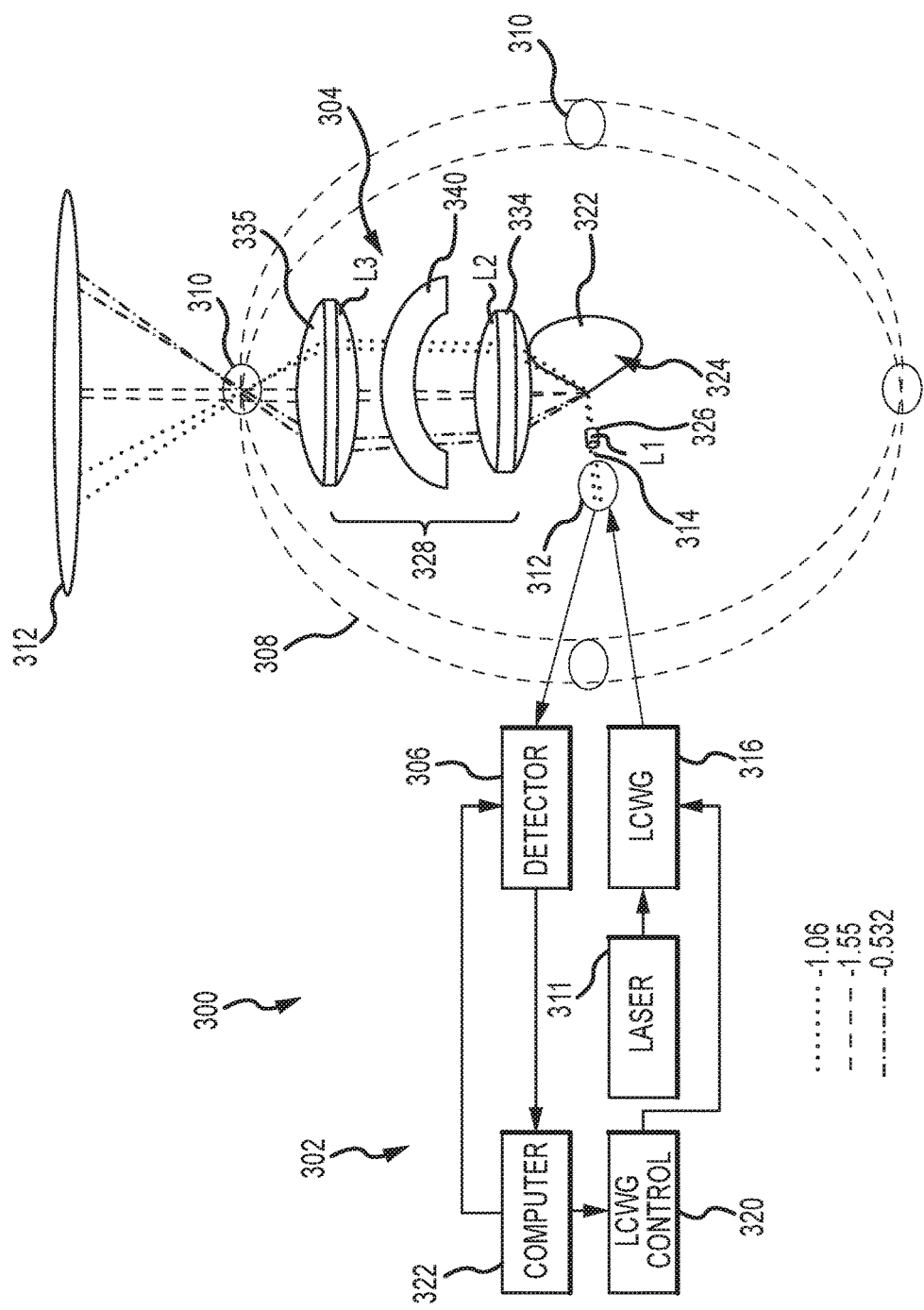
FIG. 6 illustrates an embodiment of a LCWG steered situational sensor including optics L1, L2 and L3 for converting the wavelength of the spot-beam and scanning the redirected spot-beam through discrete apertures.
Figure 7A:
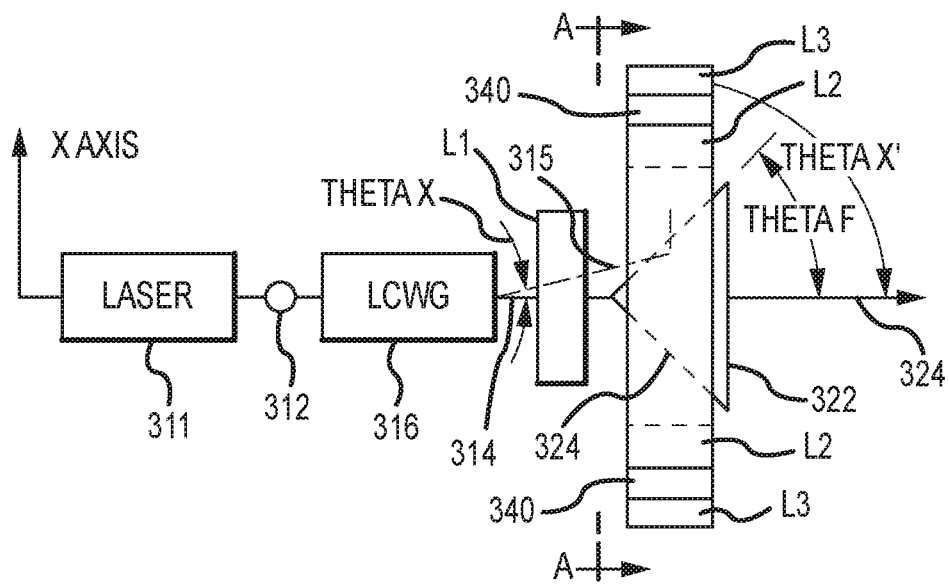
FIGS. 7a-d are top, side, section A-A and section B-B views of the situational awareness sensor of FIG. 6.
Figure 7B:
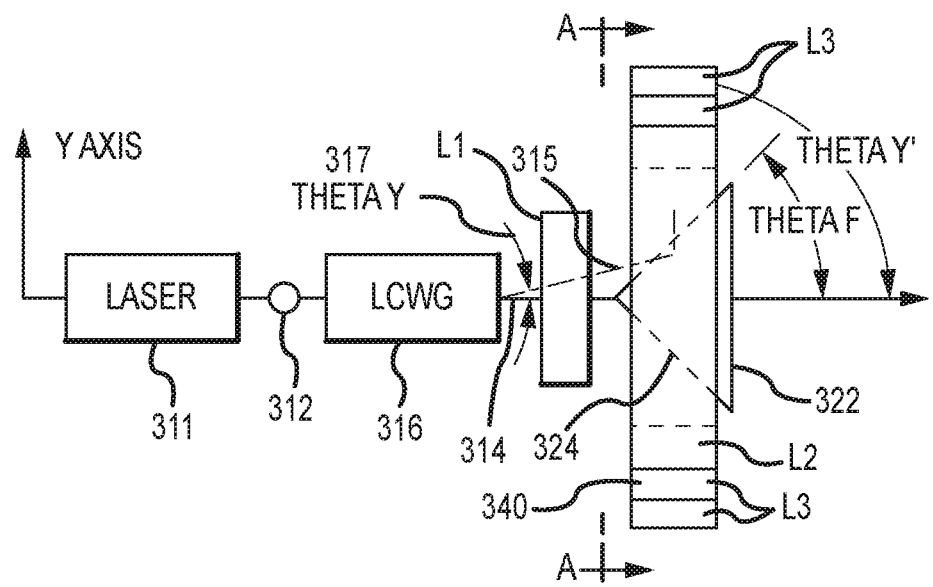
Figure 7C:
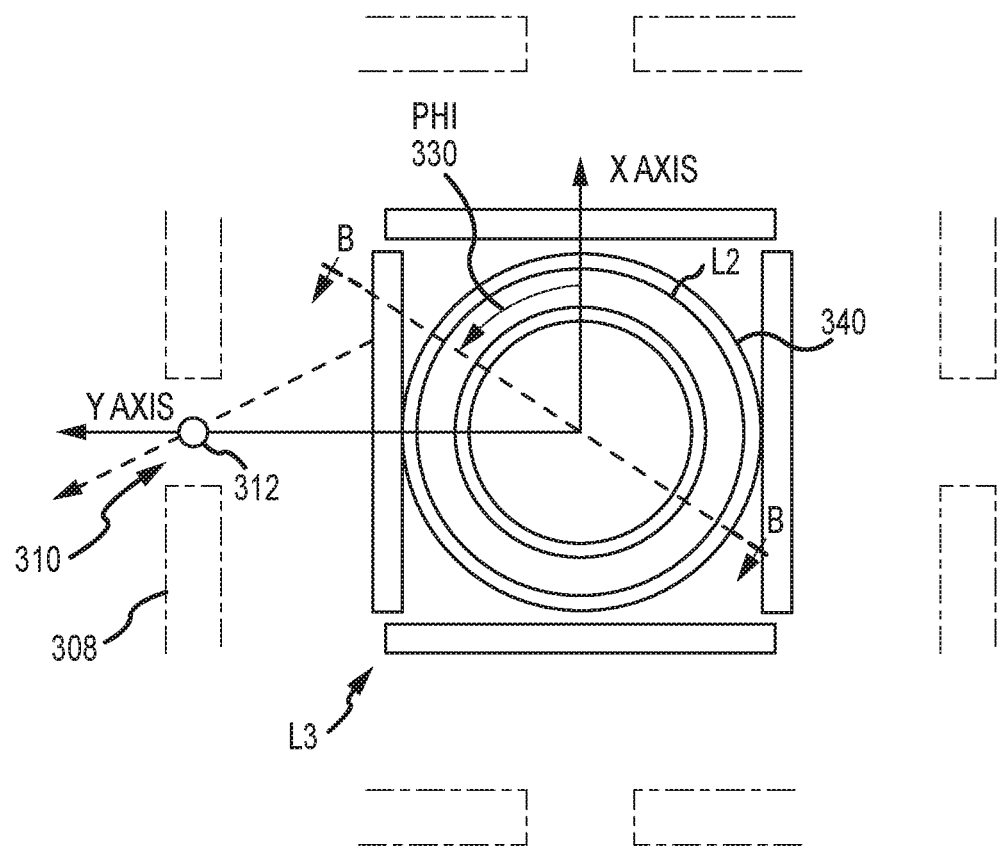
Figure 7D:
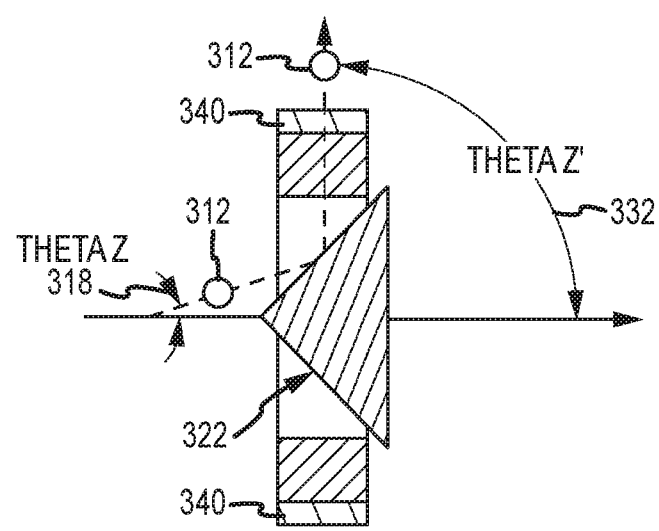

Referring now to FIG. 5, an embodiment of a multispectral extended range laser transmitter 200 integrates a ring amplifier 202 with a multispectral laser transmitter. As shown, the spot-beam is amplified prior to wavelength conversion. Typical amplifier gain medium may change the wavelength slightly. Thus it is preferred to amplifier prior to wavelength conversion. This also reduces the need for different gain mediums for each of the converted wavelengths, further reducing the SWaP.

A laser 204 is configured to generate a collimated spot-beam 206 at an input wavelength along an optical axis 208. A LCWG 210 is oriented along the optical axis 208 and is responsive to command signals to steer the collimated spot-beam 206 at the input wavelength in two-dimensions about the optical axis 208. A fixed mirror 210 comprising different conic sections 212, 214 and 216 is oriented along the optical axis 208 to redirect the spot-beam 206 to a location in the two-dimensional FOV.

Ring amplifier 202 comprises one or more pumps 222 configured to pump a ring-shaped gain medium 224 is placed around the optical axis 208 between the conic sections of fixed mirror 210 and green and blue annular sections of NLM 226 and 228. A system of mirrors 230 positioned fore and aft of the gain medium 224 is configured to redirect the spot-beam to pass through the gain medium one or more times to amplify the spot beams while preserving the steering of the spot-beam over the FOV. Gratings may be used to form the mirrors.

In an embodiment, a single system of mirrors is used to redirect the spot-beam through the gain medium for all of the wavelengths. A single entrance mirror and a single exit mirror redirect the spot-beam from different locations on the fixed mirror (different conic sections) to enter the sidewall of the gain medium at different angles. This could result in losses or at least unequal amplification between the wavelengths. It may be desirable to power one or more of the sidewall mirrors or add mirrors to avoid beam walk-off.

For this embodiment, an entrance mirror 232 intercepts the spot-beam from each of the three conic sections and redirects the spot-beam parallel to optical axis 208 through a first sidewall 234 of the gain medium. A plurality of mirrors 236 are configured to redirect the spot-beam to pass back-and-forth through the gain medium between the second and first sidewalls 238, 234 multiple times to amplify the spot-beam before exiting the first sidewall parallel to the optical axis. An exit mirror 240 is configured to redirect the amplified spot-beam to a mirror 242 that redirects the spot perpendicular to the optical axis to pass through the green NLM 226, to a mirror 244 that redirects the spot perpendicular to the optical axis to pass through the blue NLM 228 and to redirect the spot perpendicular to the optical axis to directly output the red spot-beam. The light entering the amplifier will have slightly decreased efficiency since the interfaces are non-normal to the sidewalls.

In another embodiment, the system of mirrors has an entrance and exit mirror for each wavelength that redirects the spot-beams substantially normal to the sidewalls to avoid losses and provide a more uniform amplification. This requires additional mirrors.

In an embodiment in which a single NLM section is used to convert the input wavelength to a different output wavelength, the ring amplifier may be positioned inside the NLM section to amplify the spot prior to wavelength conversion or outside the NLM section to convert the wavelength prior to amplification.

Referring now to FIGS. 6 and 7a-7d, an embodiment of a situational awareness sensor 300 includes a laser transmitter 302 steerable about a 360° horizontal field of a view, a wavelength converter 304 and a detector 306 responsive to the converted output wavelength. The sensor is illustrated as a single wavelength sensor for simplicity. The principles apply equally to a multispectral sensor.

Sensor 300 includes a housing 308 having four discrete apertures 310 formed about its circumference at 90° (360°/4) intervals. More generally, the number of apertures and spacing is dictated by the application. The housing comprises a structural member configured to provide support primarily in the direction parallel to the sensor axis.

A laser 311 is configured to generate a collimated spot-beam 312 at an input wavelength (e.g. a red laser at 1.06 micron) along an optical axis 314 that is oriented in the Z direction. A LCWG 316 is oriented along the optical axis and is responsive to command signals to steer the spot-beam 312 about the optical axis to a location Theta X 315 and Theta Y 317 from the optical axis where Theta X is the angle between the projection of the instantaneous location of the axis of the spot-beam on the X-Y plane and the Z-axis and Theta Y is the angle between the instantaneous location of the axis of the spot-beam and the Z-axis such that Theta X is in the plane of the X-axis and Theta Y is in the plane of the Y-axis. Theta Z 318 is the angle between the projection of the instantaneous location of the axis of the steered spot-beam and the Z-axis.

Because of the rotational symmetry, the position of the X axis is, more or less, arbitrary. In this description, X is parallel to the "in plane" steering direction of the waveguide and Y is parallel to the "out of plane" steering direction of the waveguide. Making X parallel to the in plane steering direction of the waveguide simplifies the description, but it does not have to be in this location, there is a straightforward transform to relate any choice of X to the in plane steering direction.

A controller 320 is configured to issue command signals to the LCWG 316 to steer the spot-beam 312 to the desired Theta X and Theta Y. A computer 322 is configured to issue signals to the controller 320 that provide the desired Theta X and Theta Y to implement a continuous scan, illumination of multiple discrete objects, variable dwell time, compensation for an external signal etc.

A fixed mirror 322 has a conical shape 324 that is oriented along the optical axis 314 (coincident with or offset from in different configurations) to redirect the spot-beam 312. In this particular configuration, conical shape 324 is a normal cone (CN1) that is rotationally symmetric about its axis, which is coincident with the optical axis 314. The tip of the cone is positioned towards the LCWG with the radius of the cone increasing along the axis away from the LCWG. In a multispectral application with multiple conic sections, each conic section is typically non-isometric to preserve the steering of the spot-beam.

An optic L1 326 is configured to focus the collimated spot-beam 312 onto the conical shape of the fixed mirror, which in turn redirects the spot-beam 312. Optic L1 is suitably configured so that its focal point is at the conical shape of the fixed mirror. This creates the minimum spot size on the conical surface. Since the round beam is actually being projected onto a curved surface, there is distortion of the beam due to the mirror's surface. Keeping the spot small makes the spot project on a "localized flat" surface. Optic L1 could be integrated into conical shape 324.

Four optical channels 328 are positioned between fixed mirror 322 and a different one of the apertures 310 in the housing 308 to guide the redirected spot-beam 312 through the corresponding aperture 310 to a location Phi 330 and Theta Z' 332 where Phi is the angle between the projection of the instantaneous location of the axis of the redirected spot-beam on the X-Y plane and the X axis and Theta Z' is the angle between the projection of the instantaneous location of the axis of redirected spot-beam on the Z axis. Theta Z' 332 is greater than Theta Z 318. The redirected spot-beam 312 scans a FOV defined by the values of Phi and Theta Z'. Theta X' is the angle between the projection of the instantaneous location of the axis of the redirected spot-beam on the X-Y plane and the Z-axis and Theta Y' is the angle between the instantaneous location of the axis of the redirected and the Z-axis.

Each optical channel 328 comprises an optic L2 334 and an optic L3 335. Optic L2 is of larger diameter to collect light coming off the mirror at +/−45 degrees (nominally). A smaller optic is achieved using more and smaller apertures. Optic L2 is placed at approximately its focal length from the mirror to collimate the light. Optic L3 is a fast (low F/#, short focal length) lens that quickly causes the light to cross and diverge out of the aperture.

Steering spot-beam 312 in a circle (constant Theta Z) around the conical shape scans the redirected spot-beam 312 from one aperture 310 to the next around a 360° FOV in Phi. Varying the radius of the circle scans the redirected spot-beam 312 in a defined FOV in Theta Z'. The angle Theta F 336 of the conical shape 324 of fixed mirror 312 may or may not be configured such that the spot-beam 312 is redirected perpendicular to optical axis 314. When Theta F produces a Theta Z' perpendicular to the Z-axis, the situational awareness sensor has a two-dimensional band of coverage comprised of Phi and Theta Z' that is centered on the Z axis along with the fixed mirror 46. Increasing or decreasing Theta F increases or decreases the nominal Theta Z', respectively. This shifts the two-dimensional band of coverage comprised of Phi and Theta Z' along the Z axis.

Each optical channel 328 further comprises a segment 340 of NLM, which together form a discrete annular ring about fixed mirror 322. The segment 340 of NLM converts the input wavelength of spot-beam 312 to a different output wavelength.

Detector 306 is configured to sense a reflected component of the spot-beam at the output wavelength. The reflected component may be processed to provide an intensity of the illuminated object or a range to the illuminated object.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A laser device, comprising:
   a laser configured to generate a collimated spot-beam at an input wavelength along an optical axis;
   a liquid crystal waveguide (LCWG) along the optical axis responsive to command signals to steer the collimated spot-beam at the input wavelength in two-dimensions about the optical axis;
   a controller configured to issue command signals to the LCWG to steer the collimated spot-beam;
   a fixed mirror including a first conic section oriented along the optical axis that redirects the collimated spot-beam to scan a two-dimensional field-of-view (FOV); and
   a first annular cylindrical shaped optical element with a first optical non-linear material oriented along an axis coincident with the optical axis, said redirected collimated spot-beam passing through the first optical non-linear material to convert the input wavelength to a different first output wavelength while preserving the steering of the collimated spot-beam over the FOV.

2. The laser device of claim 1, further comprising:
   a detector configured to sense a reflected component of the collimated spot-beam at the output wavelength.

3. The laser device of claim 1, wherein the LCWG is configured to steer the collimated spot-beam in a range about the input wavelength, wherein the different first output wavelength lies outside said range.

4. The laser device of claim 1, wherein the fixed mirror includes a second conic section different than said first conic section, said second conic section configured to redirect the collimated spot-beam parallel to the redirected collimated spot-beam from the first conic section whereby the collimated spot-beam is transmitted at a second output wavelength different than said first output wavelength, said controller configured to issue command signals to the LCWG to steer the collimated spot-beam to said first and second different conic sections to scan a multispectral spot-beam over the two-dimensional FOV.

5. The laser device of claim 4, wherein the collimated spot-beam redirected from the second conic section is transmitted at the input wavelength as the second output wavelength over the FOV.

6. The laser device of claim 4, further comprising:
   a second annular cylindrical shaped optical element with a second optical non-linear material oriented along the axis coincident with the optical axis, said collimated spot-beam redirected from the second conic section passing through the second optical non-linear material to convert the optical wavelength to the different second output wavelength while preserving the steering of the collimated spot-beam over the FOV.

7. The laser device of claim 4, wherein the controller is configured to issue command signals to steer the collimated spot-beam sequentially around the first conic section to scan the two-dimensional FOV at the first output wavelength and around the second conic section to scan the two-dimensional FOV at the second output wavelength to sequentially multiplex the first and second output wavelengths.

8. The laser device of claim 4, wherein the controller is configured to issue command signals to steer the collimated spot-beam back-and-forth between the first and second conic sections to time multiplex the first and second output wavelengths to scan the two-dimensional FOV.

9. The laser device of claim 8, wherein the controller is configured to issue command signals to increment the position of the scan in the FOV to time and sequentially multiplex the first and second output wavelengths to scan the two-dimensional FOV.

10. The laser device of claim 4, further comprising:
    an L0 optic positioned between the LCWG and the fixed mirror to shape the spot-beam to have an oblong shape whose major axis is oriented along optical axis so that the collimated spot-beam covers both the first and second conic sections to simultaneously generate the multispectral output.

11. The laser device of claim 4, further comprising:
    a ring amplifier comprising one or more pumps configured to pump a gain medium in the form of a ring around said optical axis, said ring amplifier configured such that the collimated spot-beam at the input wavelength as redirected from said first or said second conic section passes through the gain medium one or more times to amplify the collimated spot-beam while preserving the steering of the spot-beam over the FOV.

12. The laser device of claim 1, wherein said optical axis is oriented in the Z direction,
    said LCWG is configured to steer the collimated spot-beam about the optical axis to a location Theta X and Theta Y from the optical axis where Theta X is the angle between the projection of the instantaneous location of the axis of spot-beam on the X-Y plane and the Z axis and Theta Y is the angle between the instantaneous location of the axis of the spot-beam and the Z axis such that Theta X is in the plane of the X axis and Theta Y is in the plane of the Y axis, Theta Z is the angle between the projection of the instantaneous location of the axis of the steered collimated spot-beam and the Z axis;
    said controller is configured to issue command signals to the LCWG to steer the collimated spot-beam to the desired Theta X and Theta Y; and
    said fixed mirror's conic section is configured to redirect the collimated spot-beam to a location Phi and Theta Z' where Phi is the angle between the projection of the instantaneous location of the axis of the redirected spot-beam on the X-Y plane and the X axis and Theta Z' is the angle between the projection of the instantaneous location of the axis of redirected spot-beam on the Z axis and Theta Z' is greater than Theta Z, wherein the redirected collimated spot-beam scans a field-of-view (FOV) defined by the values of Phi and Theta Z'.

13. The laser device of claim 1, further comprising:
    an optic L1 configured to focus the collimated spot-beam onto the conical section of the fixed mirror;
    a structural member configured to provide support primarily in the direction parallel to the sensor axis, said structural support having N discrete apertures formed therein at 360/N degree intervals; and N transport optic channels placed around the fixed mirror at 360/N degree intervals, each channel comprising a cylindrical optic L2 configured to collimate the redirected spot-beam and a cylindrical optic L3 configured to direct the redirected collimated spot-beam through the corresponding aperture.

14. The laser device of claim 1, wherein the LCWG is not configurable to steer the collimated spot-beam at the first output wavelength.

15. A laser device, comprising:
a laser configured to generate a collimated spot-beam at an input wavelength along an optical axis;
a liquid crystal waveguide (LCWG) along the optical axis responsive to command signals to steer the collimated spot-beam at the input wavelength in two-dimensions about the optical axis;
a fixed mirror including first and second different conic section oriented along the optical axis that redirect the collimated spot-beam to scan a two-dimensional field-of-view (FOV);
a first annular cylindrical shaped optical element with a first optical non-linear material oriented along an axis coincident with the optical axis, said optical element configured such that the collimated spot-beam redirected from said first conic section passes through the first optical non-linear material to convert the input wavelength to a different first output wavelength while preserving the steering of the collimated spot-beam over the FOV; and
a controller configured to issue command signals to the LCWG to steer the collimated spot-beam to said first and second different conic sections to scan a multispectral spot-beam at the first output wavelength and a second output wavelength over the two-dimensional FOV.

16. The laser device of claim 15, wherein the spot-beam redirected from the second conic section is transmitted at the input wavelength as the second output wavelength over the FOV.

17. The laser device of claim 15, further comprising:
a second annular cylindrical shaped optical element with a second optical non-linear material oriented along the axis coincident with the optical axis, said second optical element configured such that the collimated spot-beam redirected from said second conic section passes through the second optical non-linear material to convert the input wavelength to the second output wavelength while preserving the steering of the collimated spot-beam over the FOV.

18. The laser device of claim 15, wherein the controller is configured to issue command signals to steer the collimated spot-beam sequentially around the first conic section to scan the two-dimensional FOV at the first output wavelength and around the second conic section to scan the two-dimensional FOV at the second output wavelength.

19. The laser device of claim 15, wherein the controller is configured to issue command signals to steer the collimated spot-beam back-and-forth between the first and second conic sections to time multiplex the first and second output wavelengths to scan the two-dimensional FOV.

20. The laser device of claim 19, wherein the controller is configured to issue command signals to increment the position of the scan in the FOV to time and sequentially multiplex the first and second output wavelengths to scan the two-dimensional FOV.

21. The laser device of claim 15, further comprising:
an L0 optic positioned between the LCWG and the fixed mirror to shape the collimated spot-beam to have an oblong shape whose major axis is oriented along optical axis so that the collimated spot-beam covers both the first and second conic sections to simultaneously generate the multispectral output.

* * * * *